(12) United States Patent
Manninen

(10) Patent No.: US 9,334,606 B2
(45) Date of Patent: May 10, 2016

(54) SEAMING ELEMENT FOR INDUSTRIAL TEXTILES AND METHOD OF MANUFACTURE

(71) Applicant: AstenJohnson, Inc., Charleston, SC (US)

(72) Inventor: Allan R. Manninen, Stittsville (CA)

(73) Assignee: AstenJohnson, Inc., Charleston, SC (US)

( * ) Notice: Subject to any disclaimer, the term of this patent is extended or adjusted under 35 U.S.C. 154(b) by 0 days.

(21) Appl. No.: 14/427,916

(22) PCT Filed: Nov. 12, 2013

(86) PCT No.: PCT/CA2013/000960
§ 371 (c)(1),
(2) Date: Mar. 12, 2015

(87) PCT Pub. No.: WO2014/075170
PCT Pub. Date: May 22, 2014

(65) Prior Publication Data
US 2015/0247280 A1    Sep. 3, 2015

(30) Foreign Application Priority Data

Nov. 13, 2012    (CA) ...................................... 2795208

(51) Int. Cl.
*F16G 3/02*    (2006.01)
*D06H 5/00*    (2006.01)
(Continued)

(52) U.S. Cl.
CPC .............. *D06H 5/001* (2013.01); *D21F 1/0054* (2013.01); *D21F 7/10* (2013.01); *F16G 3/02* (2013.01); *Y10T 428/24198* (2015.01)

(58) Field of Classification Search
CPC ............... F16G 3/02; D21F 1/12; D21F 7/10; D21F 1/0054; Y10S 162/904
USPC ........................................................... 428/58
See application file for complete search history.

(56) References Cited

FOREIGN PATENT DOCUMENTS

CA    2749477 A1    2/2013
CN    102405316 A    4/2012
(Continued)

OTHER PUBLICATIONS

International Search Report and Written Opinion dated Feb. 14, 2014 for International Application No. PCT/CA2013/000960, International Filing Date: Nov. 12, 2013 consisting of 8-pages.

(Continued)

*Primary Examiner* — Alexander Thomas
(74) *Attorney, Agent, or Firm* — Christopher & Weisberg, P.A.

(57) ABSTRACT

A seaming element for an industrial textile and a method of manufacture. The seaming element comprises an elongate body folded along its length at a folded connection region comprising a plurality of channeled protrusions securable to corresponding channeled protrusions of a complementary seaming element affixed to an opposing seamable edge. First and second body members extend from respective edges of the folded connection region, each body member being directly securable to the first seamable edge. At least one of the body members comprises a longitudinal profiled region proximate and substantially parallel to a free edge of the respective member. The method includes providing an array of apertures to form the channeled protrusions, and the profiled region is formed in a progressive roll forming process. The seaming element enables improved consistency and reliability of bonding of the element to the textile by laser welding, adhesives or other methods.

10 Claims, 15 Drawing Sheets

(51) Int. Cl.
*D21F 7/10* (2006.01)
*D21F 1/00* (2006.01)

(56) References Cited

FOREIGN PATENT DOCUMENTS

| DE | 3533932 A1 * | 3/1987 | ........... B62D 55/213 |
|---|---|---|---|
| GB | 985760 A | 3/1965 | |
| WO | 2010/121360 A1 | 10/2010 | |
| WO | 2010121360 A1 | 10/2010 | |
| WO | 2011069259 A1 | 6/2011 | |

OTHER PUBLICATIONS

PCT Notification Concerning Transmittal of International Preliminary Report on Patentability Form/PCT/IPEA/416, dated Jan. 26, 2015 for corresponding International Application No. PCT/CA2013/000960; International Filing Date: Nov. 12, 2013 consisting of 10-pages.

1st Chinese Office Action in both Chinese and its English translation dated Nov. 2, 2015 for corresponding Chinese National Stage Application Serial No. 201380052184X, consisting of 14 pages.

* cited by examiner

SEAMING ELEMENT FOR INDUSTRIAL TEXTILES AND METHOD OF MANUFACTURE

CROSS-REFERENCE TO RELATED APPLICATIONS

This application is a submission under 35 U.S.C. §371 for U.S. National Stage patent application of, and claims priority to, International Application Number PCT/CA2013/000960 entitled SEAMING ELEMENT FOR INDUSTRIAL TEXTILES AND METHOD OF MANUFACTURE filed Nov. 12, 2013, which International application is related to and claims priority to Canadian Application Serial No. 2,795,208 filed Nov. 13, 2012, the entirety of all of which are incorporated herein by reference.

FIELD OF THE INVENTION

The invention concerns nonwoven seaming elements or structures which are intended to be bonded to the opposed seamable edges of an industrial textile so as to allow them to be joined in a seaming process. The invention is particularly concerned with a method of making seaming elements for this purpose, and seaming elements so made which exhibit improved reliability of bond strength following manufacture.

BACKGROUND OF THE INVENTION

Nonwoven film-type seaming elements for seaming woven and non-woven textiles are known. WO 2010/121360 (Manninen) discloses a seaming element for use in seaming an industrial textile. The seaming element is constructed and arranged to be affixed in a seaming position by being bonded to two of the substantially planar surfaces of the textile proximate the edges to be joined. The element includes first lateral edge region including an extension which defines both a longitudinal channel to accept a pin or pintle, and a plurality of apertures and land areas to allow for interengagement with a second seaming element at the second edge of the textile, and a second lateral edge which is to be bonded to the seaming edge of the textile. Various configurations of the seaming element are provided.

CA 2,749,477 (Manninen) discloses a profiled seaming element for use in an industrial textile where both the seaming element and the textile are each of profiled polymeric construction, e.g. formed from a slit and embossed film.

CA 2,762,349 (Manninen) discloses a seaming element that is constructed so as to provide two or more looped regions, thereby creating at least two channels across the seam, which allows for improved distribution of the tensile load across the element. The element can be constructed from two or more layers of polymer film, so that the same total element thickness can be obtained using thinner film, which allows for significantly improved biaxial orientation and thus maximization of the physical properties, in particular tensile strength.

It has been found that the ability to effect a consistent and reliably strong bond between the elements and the textile to which they are joined is directly dependent on the quality of the weld obtained as the element is bonded in place such as by a laser welding or similar technique. The lateral end regions comprising the legs or ends of the U-shaped element must be placed in intimate contact with the yarns or film to which they are to be bonded. Ideally, this contact extends over the entire surface of each individual yarn or textile component with which the element is in contact. During a laser welding process, for example, difficulties have been encountered with respect to applying a consistent pressure to the element as the weld is made to ensure its strength.

As shown in FIG. 1, the exterior surfaces of the exemplary seaming element of the prior art are flat. Where the seaming element is applied to a woven textile, the element is slipped over the yarn ends of the textile at its edge, for example in the manner shown in FIG. 2, prior to the welding process. The element is then pressed against the outside surfaces of the yarn ends as it is welded; a radiant energy absorbing material is located at the interface between the interior of the seaming element and the exterior of the yarn ends at the bonding region. A through-transmission laser welding process is used which allows the radiant energy of the laser to pass through the seaming element, for example, to the interface at which the radiant energy absorbing material is located. This material warms to the melting point of the yarns and seaming element and creates a weld between the two materials at their interface.

In certain instances, irregularities in the edge of a nonwoven film textile, or the surface profile of yarn ends of a woven textile (e.g. the individual yarns are slightly twisted, or out of plane) do not allow for the desired intimate contact between the seaming element and film or yarns to be achieved. This lack of intimate contact can result in a weaker bond between the element and the textile. Following welding, the seam must be inspected closely to ensure that all bonds have been effectively made and the overall seam strength is reliable. This is difficult to determine and time consuming to do.

FIG. 1 is a perspective view of a prior art seaming element 100 which has a top surface 120, a bottom surface 121, a left edge (or end) 122, a right edge or end 124, a leading edge 126 and a trailing edge 128. The seaming element 100 further includes along its leading edge 126 a plurality of protrusions 150 between which are located notches 152. The notches 152 and protrusions 150 are dimensioned such that protrusions 150 on one seaming element 100 will fit into corresponding notches 152 on a second seaming element 100, to allow the two seaming elements 100 to be joined. The notches 152 extend into the body of the seaming element 100 from the leading edge 126 towards the trailing edge 128 a sufficient distance to allow corresponding protrusions from a second seaming element to be accurately located in the desired position within these notches. FIG. 1 is a perspective view of a seaming element 100 before being secured to an end or edge of a fabric to be seamed.

FIG. 2 is a cross-sectional side view of the seaming element 100 as it would be attached to a fabric 90. The fabric 90 includes a set of first (upper) warp yarns 103, and a set of second (lower) warp yarns 104, interwoven with weft yarns, comprising (smaller) first weft yarns 105, and (larger) second weft yarns 106. The fabric 90 has a first surface 123 upon which a product may be conveyed (corresponding to surface 120 of the seaming element 100) and a second surface 125 which in use will be in contact with the various moving and stationary elements of the machine for which it is intended.

The seaming element 100 is attached to the fabric 90 by inserting the warp yarns 103 and 104 into the interior of the U-shaped seaming element 100 at an end area of the fabric where selected weft yarns 105 and 106 have been removed. The warp yarns 103, 104 can be inserted in any suitable manner, but preferably the warp yarns 103 and 104 are cut evenly along the fabric edge, and several of the weft yarns 105 and 106 are removed from the fabric 90 to produce free ends of the warp yarns 103, 104 of a desired length. As shown in FIG. 2, these warp yarn free ends are then flattened and compressed to bring them together in the area 170, extending into the space within the seaming element 100 in such manner as to leave a channel 154 which is dimensioned to accept a pintle to secure the seaming element to a corresponding second seaming element to complete the seam. The warp yarn free ends are then affixed, for example by welding or bonding, at region 175 to the seaming element 100.

It will be appreciated that some of the warp yarns 103 and 104 in the region 175 may be mutually non-planar or otherwise misaligned and, in order to arrange them into a continuous and essentially homogenous planar array suitable for insertion into the area 170, it may be necessary to apply both heat and pressure to align them. The seaming element 100 must then be bonded such as by a laser welding process to this array so that a reliable and consistent bond is provided between the element and yarns. This is typically done using a so-called global ball or roller type laser which is passed over the exterior surfaces 120, 121 of the element 100. A through-transmission laser welding process is preferred for this purpose, and allows the exterior surfaces of the yarns 103, 104 in the area 170 to be securely welded to the interior of the seaming element 100. While an effective bond may be formed between a large proportion of the yarns 103, 104 and the element 100, there may be some for which only a partial weld is effected. These are difficult to detect but, because this bond must be reliably ensured (as it is critical to the successful operation of the textile), it is necessary to test or inspect a large proportion of the welds to ensure they are satisfactory. This is a time-consuming and tedious process for textiles having a typical width of between 3 m and 10 m, and the testing may not always be completely reliable.

Similar problems can also arise in relation to non-woven textiles, where any irregularity in the edges may reduce the effectiveness of the weld.

What is needed, therefore, is a mechanical means of assuring that a satisfactory bond is formed between the seaming element and the yarns or film in the welding process. In laser welding of materials such as plastics, pressure is usually an important parameter. Pressure aids heat transfer by conduction and aids fusion by forcing together the members to be welded. The laser can generate heat within the members to be welded without contact, however for an effective weld to be formed, it is necessary that the interface of the members to be welded be in as intimate contact as possible. It would be further desirable if such a means could be automated so as to minimize operator attention and intervention during the bonding process.

The present invention seeks to provide an economical and reliable method of manufacturing a seaming element, and a seaming element so produced which is constructed and arranged to ensure consistent high strength bonding of the element to the textile during the welding process.

SUMMARY OF THE INVENTION

It has now been found that one means of accomplishing a more reliable bond in the welding process is to provide to the seaming element a ridge including transitional shoulder areas which, when installed, are coplanar with the yarns or textile components to which the seaming element is to be attached, and coplanar with the portion of the seaming element that accepts a second, similarly shaped element. A suitably profiled ridge will allow a pressure contact between the laser head or other pressing element and the seaming element as the laser head is moved transversely across the fabric at the seaming area. Because the ridge area is dimensioned so as to be coplanar with the textile (i.e. it has the same thickness as the fabric to which the seaming element is to be bonded) and the seam loop area, it will assist to ensure weld quality by providing the necessary intimate contact between the seaming element and the textile components at the bond. Also, because misalignment of the yarns at the cut edge of a woven textile, or irregularity in the edge of a film textile, often results in small raised areas, the pressure exerted by the laser or pressing element may either push the misaligned yarns down into coplanar alignment with the others, or flatten the film edge, or alternatively send a signal which can be detected by the machine operator indicating that this area of the bond region requires attention.

It has been found that a simple and economical means of imparting such a ridge to the seaming element, while forming the element itself, is by means of a conventional progressive roll forming process such as is illustrated in exemplary FIG. 3. As shown in FIG. 3, a strip of generally planar material 1 is fed from left to right through a series of four tandem sets of rolls 2,3,4,5. Each roll imparts at least one bend or fold to the strip of material 1 so that, when the material reaches the right side of the process, it has now been formed into a continuous U-shaped trough. Other shapes are of course possible. It has now been found that such a process can be successfully applied to the manufacture of the seaming elements of the present invention.

According to the invention, a seaming element is formed from a strip of planar stock material which is preferably a thermoplastic film or sheet provided in a suitable width and thickness and great length. The stock material may first be blanked by punching, cutting or other suitable process to provide a plurality of regularly arranged apertures between which are located correspondingly shaped land areas which are sized so as to be capable of mating with the apertures during subsequent assembly. Alternatively, the blanking process may occur following a bending operation. The strip of stock material is then shaped and formed as desired by means of a continuous bending operation in which the strip of stock material is passed through at least one and preferably at least two tandem sets of opposed conforming rollers, each set of which is mutually shaped to impart a desired cross-sectional configuration to the strip of stock material. More than one set of rollers, each having a differing configuration from that previous to it, may be required to obtain the final desired cross-sectional shape for the eventual seaming element. The sets of rollers are arranged in sequence, with each imparting at least one bend to the stock material; the rollers may be heated or cooled as appropriate to the stock material. Following the continuous bending operation, the resulting seaming element is provided with a generally U-shaped configuration including seaming loops and loop apertures formed at the blanked area (at the bottom of the "U"), and at least one ridge and valley proximate each of the two opposite ends (the tops of the "U") used to attach the element to the textile. Each of the ends is profiled and dimensioned in a manner which will assure maximum weld strength in a laser welding or similar bonding process by providing at least one ridge that will be coplanar with the textile to which the seaming element is to be attached. A plurality of regularly arranged and suitably sized apertures are provided to the element, separated by land areas, which are correspondingly shaped and sized so as to be insertable in apertures provided to a second seaming element in an eventual seaming process. The progressive roll forming process provides a rapid and economical method for producing the seaming element, and the profiled ends improve the reliability of the connection with the industrial textile to which it is bonded.

The invention therefore seeks to provide a seaming element for seaming a first seamable edge of an industrial textile to a second seaming edge of the industrial textile, the seaming element being constructed and arranged to be affixed to the first seamable edge and comprising (i) an elongate body folded along its length at a folded connection region comprising a plurality of channeled protrusions engageable with and securable to corresponding channeled protrusions of a complementary seaming element affixed to the second seamable edge; and (ii) first and second body members extending from respective edges of the folded connection region and each having a free edge, each of the first and second body members being constructed and arranged to be directly securable to the first seamable edge, wherein at least one of the first and second members comprises a longitudinal profiled region proximate and substantially parallel to the respective free edge.

Preferably the industrial textile comprises sets of interwoven yarns, and the seaming element is constructed and arranged to be directly securable to surfaces of selected ones of the yarns at and proximate the first seamable edge.

Optionally, the industrial textile comprises at least one layer of film, and the seaming element is constructed and arranged to be directly securable to surfaces of the film.

Each of the first and second members can comprise a longitudinal profiled region, and the longitudinal profiled region of the first member may but need not be symmetrical with the longitudinal profiled region of the second member.

Optionally, the seaming element further comprises a profiled limiter means to restrict entry of the first seamable edge of the industrial textile into the folded connection region.

In one embodiment of the invention, the elongate body is folded along its length at two folded connection regions, each folded connection region comprising a plurality of channeled protrusions engageable with and securable to corresponding channeled protrusions of a complementary seaming element affixed to the second seamable edge.

The invention further seeks to provide an industrial textile provided with seaming elements according to the invention, preferably bonded to the industrial textile by laser welding or the application of an adhesive.

The invention further seeks to provide a method of making a seaming element for seaming a first seamable edge of an industrial textile to a second seamable edge of the industrial textile, the method comprising the steps of (a) providing an elongated strip of substantially planar material having opposed substantially parallel linear edges, an edge region adjacent each edge, and an intermediate region connecting the edge regions;

(b) feeding the planar material between a plurality of opposed rolls in a progressive roll forming process to provide a profile to at least one of the edge regions;

(c) before or after step (b), selectively providing at least a first array of regularly spaced apertures to the intermediate region, the apertures comprising mutually parallel slots oriented in a direction normal to the linear edges of the strip;

(d) bringing the opposed linear edges towards each other in mutual alignment to align the edge regions with each other to form a seaming element body and to configure land areas between adjacent ones of the apertures into a plurality of regularly spaced seaming loops; and (e) selectively cutting a length of the elongated strip to provide the seaming element.

Optionally, step (b) comprises providing a profile to each of the edge regions, and can comprise providing a profile to a first edge region comprising a mirror image to the profile provided to the second edge region.

Optionally, step (b) comprises providing a limiter means between at least one edge region and the intermediate region.

In one embodiment, step (c) comprises providing a first and second array of regularly spaced apertures, wherein the apertures of the first array are the same size as each other, the apertures of the second array are the same size as each other and larger than the apertures of the first array, and step (d) further comprises folding the elongated strip such that the land areas between the apertures of the second array form a first outer set of seaming loops and the land areas between the apertures of the first array form a second inner set of seaming loops.

The invention further seeks to provide a method of seaming an industrial textile, the method comprising the steps of (a) providing a first and second seaming element each according to the invention;

(b) securing the first seaming element to a first seamable edge of the industrial textile and securing the second seaming element to an opposed second seamable edge of the industrial textile;

(c) bringing the respective seaming loops of the first and second seaming elements together in alignment and securing them by a securing means.

Preferably, the securing in step (b) is by laser welding or the application of adhesives.

In the embodiments of the invention, the seaming element can comprise at least one layer of film, preferably comprising a material selected from a thermoplastic and a thermoset; preferably the material is a thermoplastic, and more preferably is a polyester, such as poly(ethylene terephthalate) (PET); poly(butylene terephthalate) (PBT); poly(ethylene naphthalate)(PEN); and poly(1,4-cyclohexylene dimethylene terephthalate) acid (PCTA).

Other polymers such as polyphenylene sulfide (PPS), polyetheretherketone (PEEK), polysulfones and polyamides may also be suitable. If the chosen material is a polyester, it may be hydrolysis stabilized so as to be resistant to thermal and hydrolytic degradation; one suitable such material is described, for example, by Manninen in CA 2,778,513. For most applications, the preferred polymer will be PET. If used, this material should have an intrinsic viscosity which is in the range of from 0.55 to 1.0 or more, and more preferably is in the range of from 0.6 to about 0.8. Where the seaming element is to be secured to the yarns by laser welding, it must have suitable optical properties so as to be transparent to the incident laser radiation, and for this aspect, a hydrolysis stabilized PET is particularly suitable. A thin layer of laser energy absorbent film can be provided to the interior or exterior of the seaming element in the manner described by Manninen C A 2758622, or the yarn ends or a film insert can be coated with a suitable laser energy absorbing dye. In instances where it is not practical to laser weld a seaming element comprised of a thermoplastic film material such as PET to the textile, it is also possible to use a thermoset plastic film or component for this purpose. Thermosets are not amenable to laser welding, and so must be secured in place by means of an appropriate adhesive or other bonding method. Thermoset films which may be suitable for this purpose include commercially available polyimides which are sold in the marketplace under the tradenames Apical™, Kapton™, UPILEX™, VTEC PI™, Norton TH™ and Kaptrex™; others may be suitable.

DETAILED DESCRIPTION OF THE DRAWINGS

Figure 1:
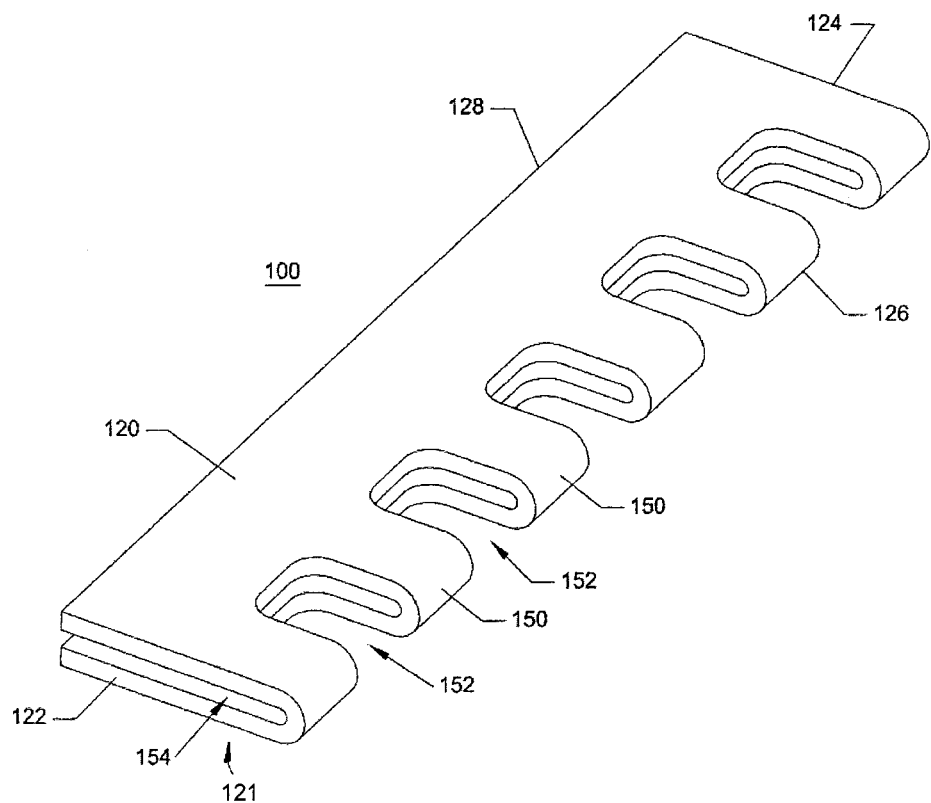
FIG. 1 is a perspective view of a seaming element according to the prior art.
Figure 2:
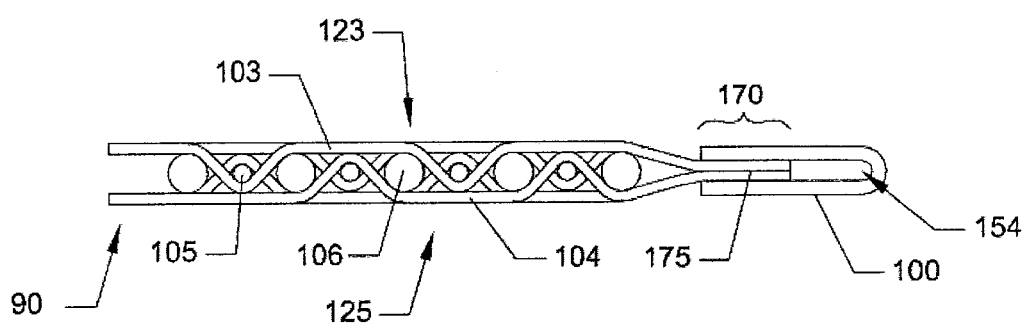
FIG. 2 is a side view of the prior art seaming element shown in FIG. 1.
Figure 3:
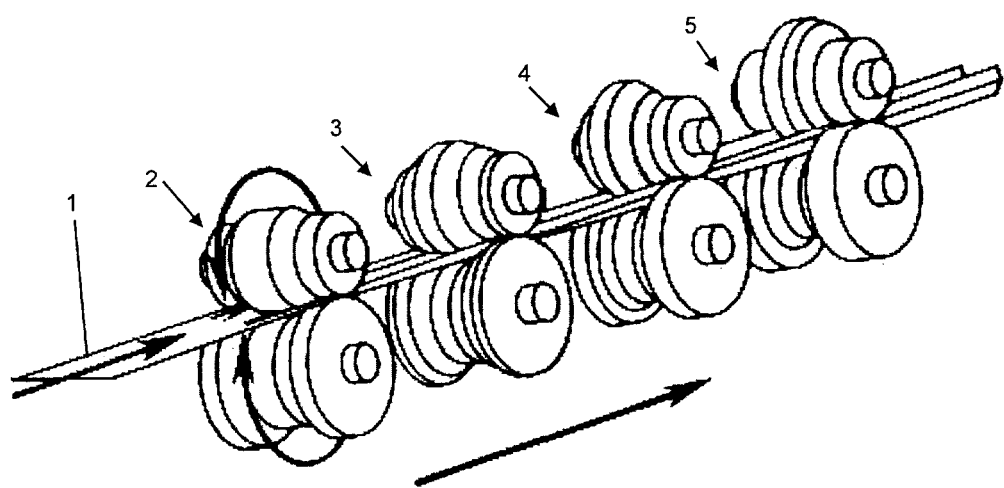
FIG. 3 is a simplified illustration of a progressive roll forming process of the prior art.

FIGS. 1 to 3 are discussed above in relation to the prior art.

Figure 4:
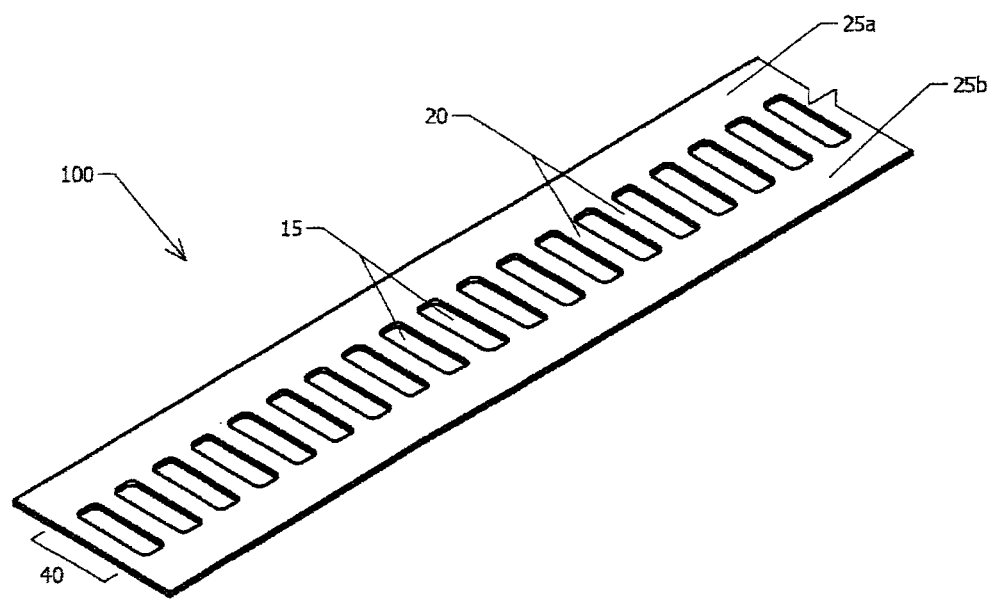
FIG. 4 is a perspective view of a blanked planar stock material for use in a progressive roll forming process to form a seaming element of the invention.

FIG. 4 is a perspective view of a blanked planar stock material 100 for use in a progressive roll forming process such as shown in FIG. 3 to form an eventual seaming element in a first embodiment of the invention. As discussed further below, the stock material 100 shown in FIG. 4 is a generally planar thermoplastic film or sheet material, such as a PET film as described in CA 2,758,622 (Manninen) or CA 2,778,513 (Manninen); other thermoplastic film or sheet materials may be suitable. The stock material 100 is provided as a strip whose length is much greater than its width. A plurality of apertures 15 (which will form eventual notches corresponding with notches 152 shown in FIG. 1) may be cut or punched ("blanked") into the strip 100 to provide a regularly spaced array. These apertures 15 are separated and defined by correspondingly shaped land areas 120 (which will form the eventual looped protrusions corresponding with protrusions 150 in the prior art seaming element shown in FIG. 1). The apertures 15 shown in FIG. 4 are located in centre region 40 which is bordered by continuous outside edges 25a, 25b of the blanked stock material 100.

It is not necessary that the stock material 100 be cut or punched in a previous blanking process; the seaming loops and apertures may be provided in a subsequent process. The order in which the apertures are provided (whether before or after roll forming) will be dependent on the desired end use properties of seaming element or manufacturing capability.

Figure 5:
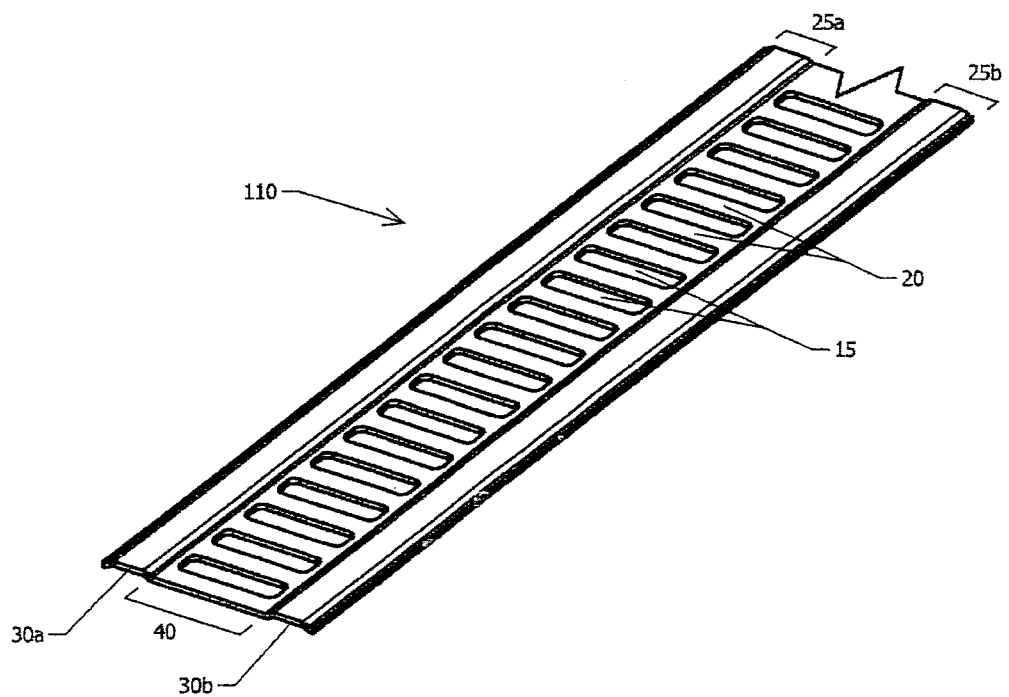
FIG. 5 is a perspective view of the stock material shown in FIG. 4 following a first progressive roll forming step in an embodiment of the invention.

The stock material 100 of FIG. 4 is then passed through at least a first tandem roll set in a progressive roll forming process to provide first shaped stock 110 shown in FIG. 5. As shown most clearly in the cross-section at FIG. 6, two ridge regions 30a, 30b are formed on either side of the stock material at the continuous outside edge regions 25a, 25b due to the configuration of the first rolls used in the roll forming process. Each ridge region 30a, 30b is precisely dimensioned so that, when the stock material is eventually bent in a later roll forming stage along the centre of region 40, the first shaped stock 110 will be formed into the desired "U" configuration (shown in FIGS. 7 and 8) and the outside edge regions 25a, 25b will be located so as to be separated by a distance equal to the thickness of the fabric material onto which the eventual seaming element will be installed.

Figure 6:
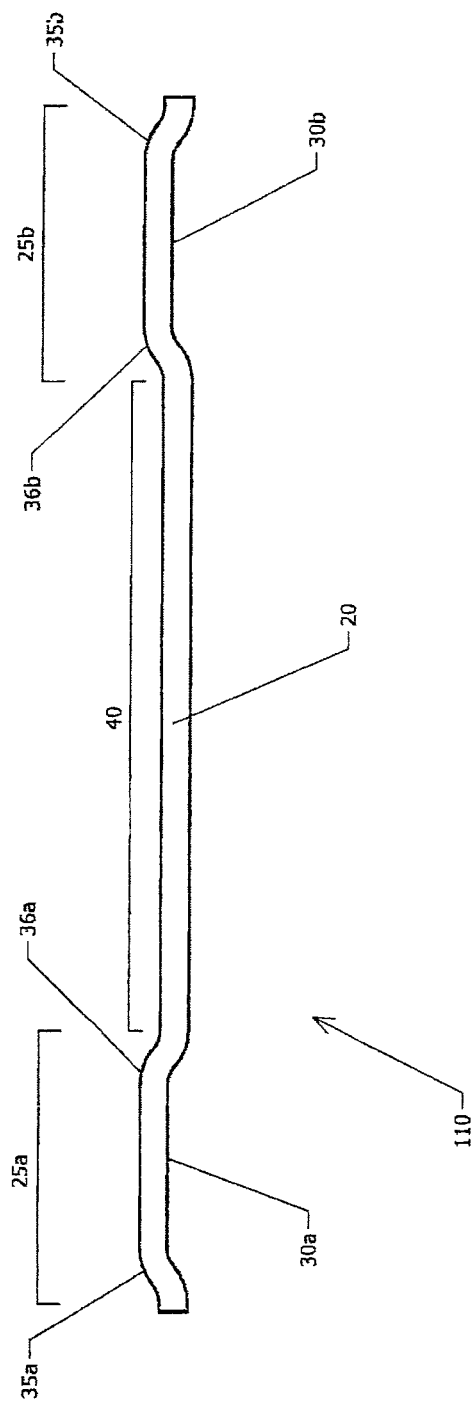
FIG. 6 is a cross-sectional end view of the stock material of FIG. 5.

FIG. 6 shows an end cross-section of the first shaped stock 110 shown in FIG. 5. Stock material 100 has been formed into first shaped stock 110 by at least one tandem set of rolls in a progressive roll forming process to provide, at outside edge region 25a, outside shoulder 35a, ridge region 30a, and inside shoulder 36a. Outside edge region 25a is separated from corresponding outside edge region 25b by centre region 40 which may include apertures 15 and land areas 20 if already formed in a previous blanking process. The cross-sectional profile of outside edge region 25b is essentially identical to that of outside edge region 25a and includes inside shoulder 36b, ridge region 30b and outside shoulder 35b. Ridge region 30a is coplanar with ridge region 30b.

Figure 7:
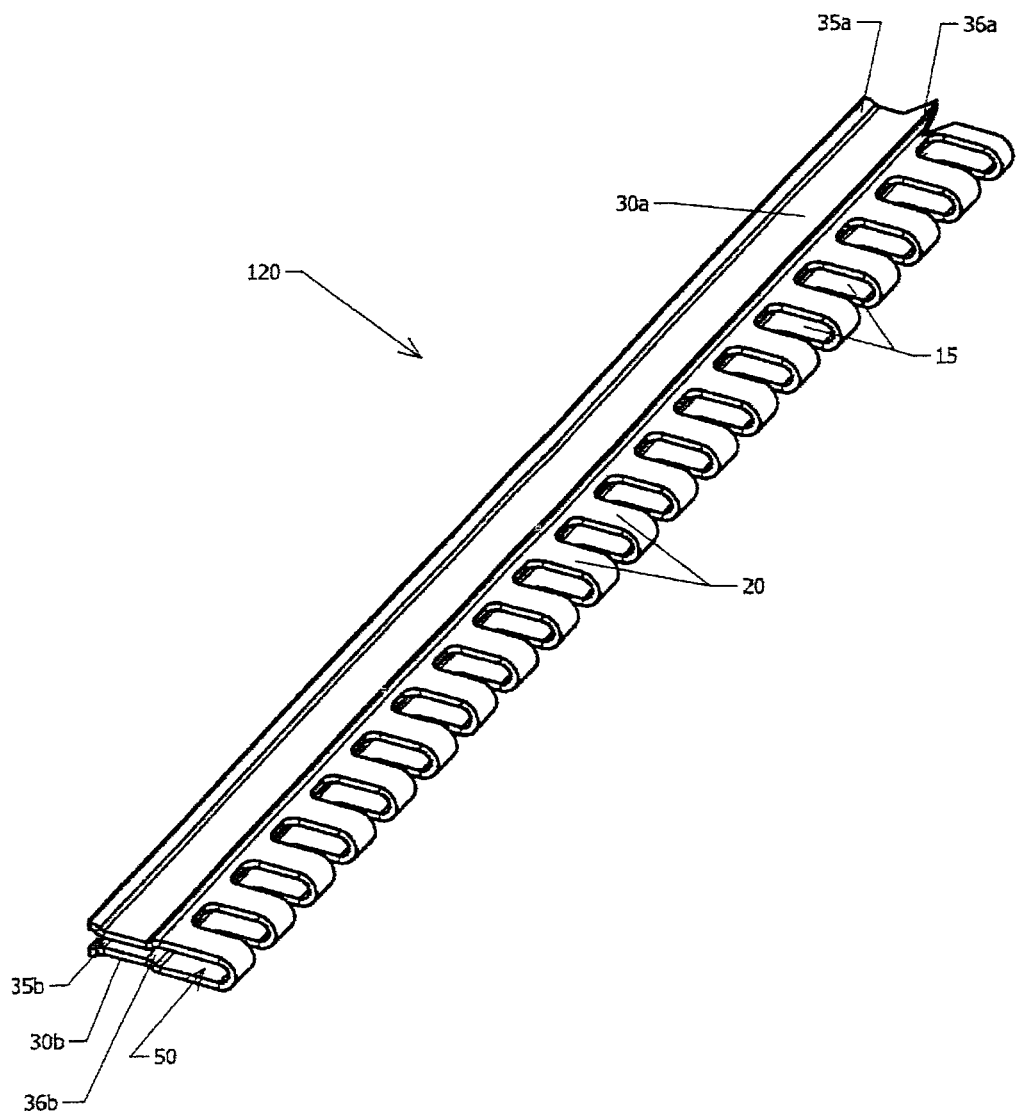
FIG. 7 is a perspective view of a seaming element in an embodiment of the invention formed from the stock material of FIGS. 4 to 6.

FIG. 7 shows the second shaped stock formed in at least one additional roll forming process step from first shaped stock 110 of FIGS. 5 and 6, to provide seaming element 120; this at least one additional forming step has imparted a U-shaped bend in the stock 110. Previously planar region 40 has been deformed along the centre line, shown here as through land areas 20, by the roll forming process to form "U" shaped loop area 45 (see FIG. 8). Outside edge regions 25a, 25b (FIGS. 5 and 6) are now located in opposed parallel relation so that ridge region 30a is located directly above ridge region 30b. Interior open area 50 has been formed inside "U" shaped area 45 as a result of the roll forming process which has deformed previously planar stock material 100 into the configuration shown in FIGS. 7 and 8. The ridge regions 30a, 30b formed between shoulders 35a, 36a, and 35b, 36b respectively in an earlier roll forming stage are now located at the outside free ends or legs of the "U".

Figure 8:
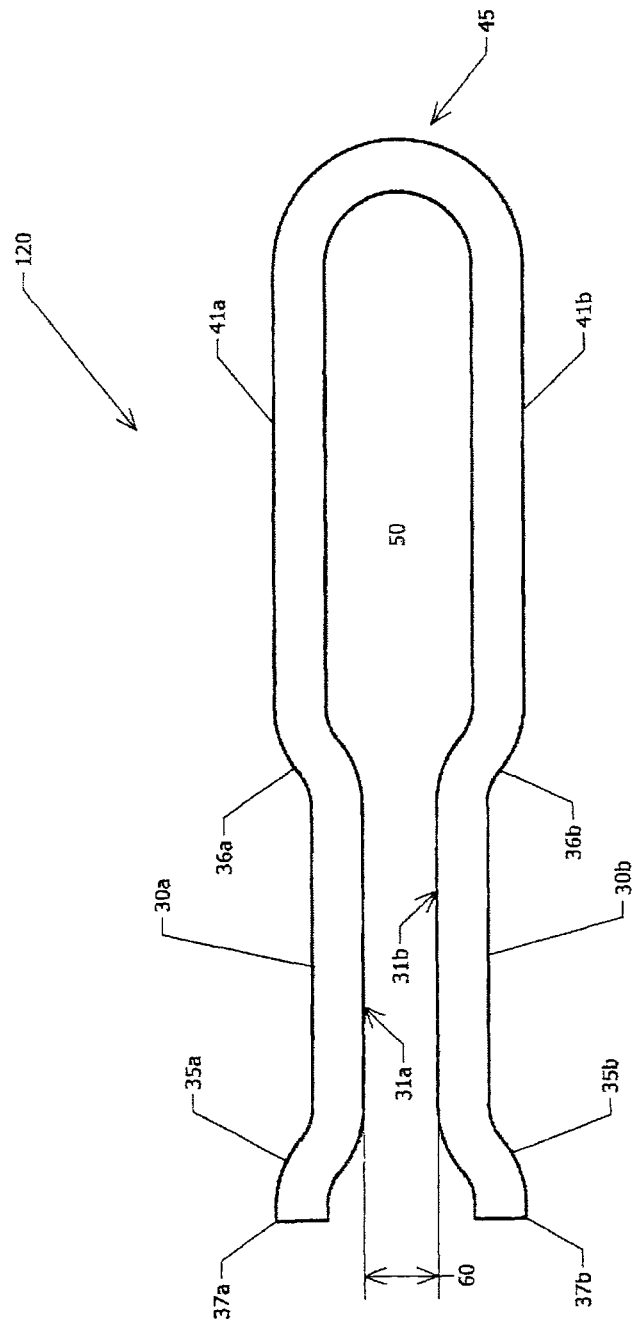
FIG. 8 is a cross-sectional end view of the seaming element of FIG. 7.

FIG. 8 is a cross-sectional view of the seaming element 120 shown in FIG. 7. Note that, at the left, the outside edges 37a, 37b of shoulders 35a and 35b are coplanar with the outside surfaces 41a and 41b of the loop area 45 of the second shape 120 on the right. Also, the space or gap 60 formed between the interior surfaces 31a, 31b of ridge regions 30a, 30b is conveniently dimensioned so as to be equal in height to the thickness of the yarns or other material, such as film, to which the seaming element is to be bonded, while interior open area 50 is dimensioned so as to accept at least one pin, pintle or similar joining element along its length. For example, the outside height of the seaming element is in the order of 1.8 mm, while the height of gap 60 is such as to accommodate the yarns and may be about 0.72 mm. This will accommodate two generally rectangular shaped yarns, each 0.36 mm thick, stacked one upon the other in the manner described in relation to FIG. 2.

Figure 9:
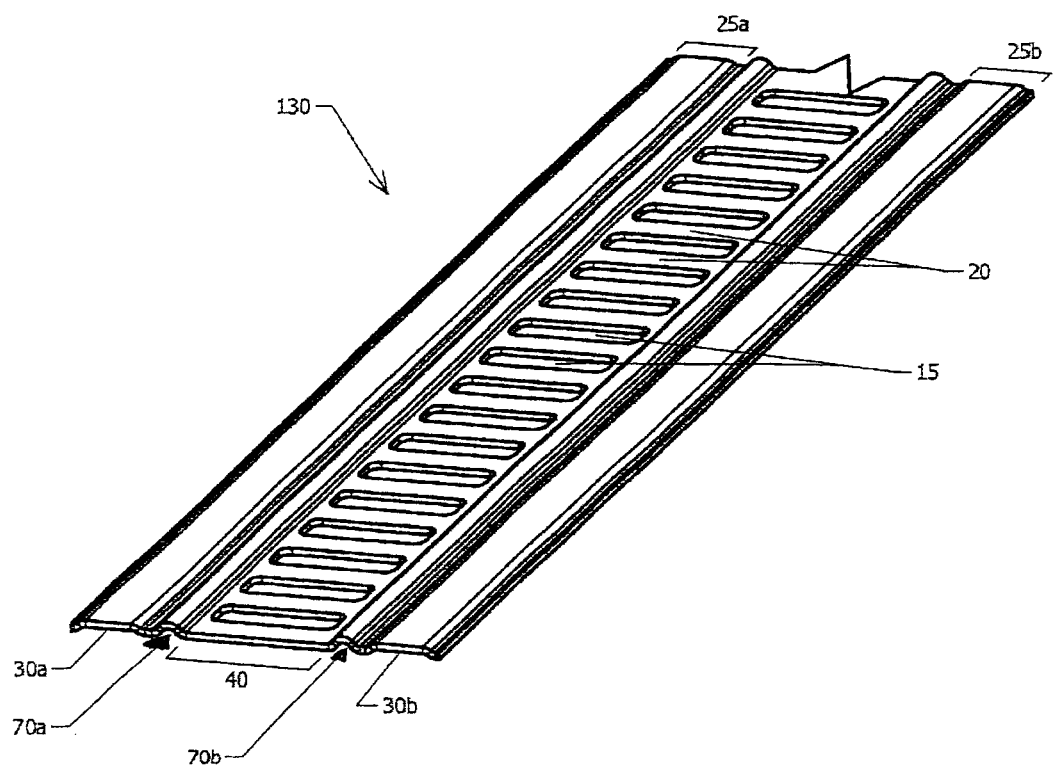
FIG. 9 is a perspective view of a blanked planar stock material following a first progressive roll forming step in a second embodiment of the invention.
Figure 10:
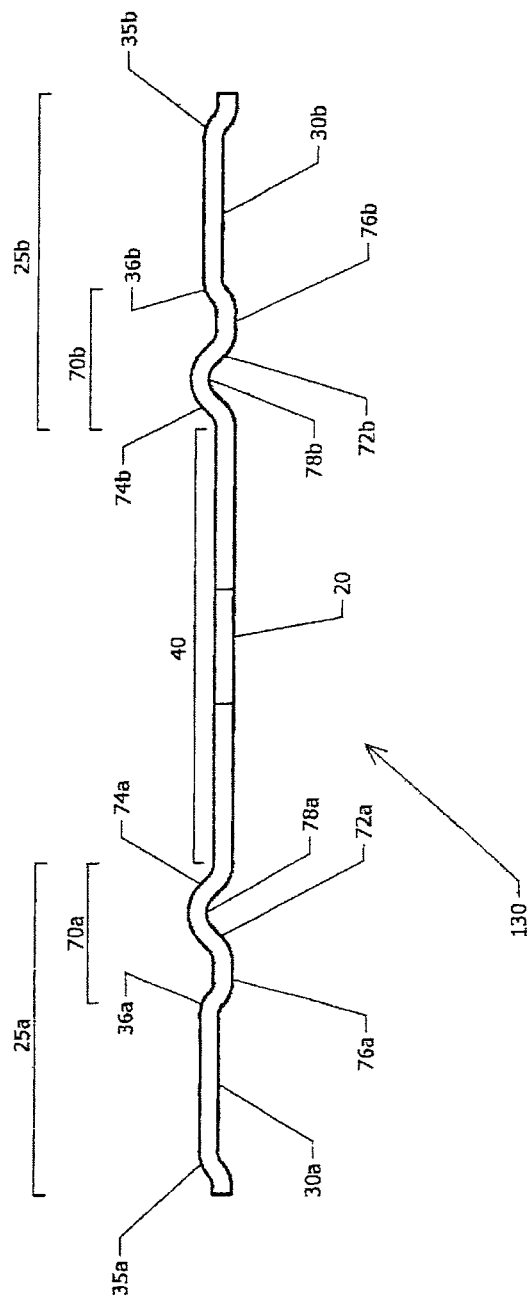
FIG. 10 is a cross-sectional end view of the stock material of FIG. 9.

Referring now to FIGS. 9 and 10, these show in perspective and cross-section respectively a second shaped stock 130 which is formed in a progressive roll forming process from a blanked planar stock material in a manner similar to that described in relation to FIGS. 4, 5 and 6. As previously discussed, it is not necessary that the stock material be cut or punched in a previous blanking process.

Two ridge regions 30a, 30b are provided on either side of the stock material at the continuous outside edge regions 25a, 25b due to the configuration of the first rolls used in the roll forming process. Each ridge region 30a, 30b is precisely dimensioned so that, when the stock material is eventually bent in a later roll forming stage longitudinally along the centre of region 40, the second shaped stock 130 will be formed into the desired "U" configuration (shown in FIGS. 11 and 12) and the outside edge regions 25a, 25b will be located so as to be separated by a distance equal to the thickness of the fabric material onto which the eventual seaming element will be installed. Shaped stock material 130 is similar in appearance to that of stock material 110 except that second ridge regions 70a,70b, which include third ridge regions 76a, 76b and fourth ridge regions 78a, 78b have now been introduced.

Referring still to FIG. 10, the profile of second shaped stock 130 is similar to that of first stock 110 shown in FIG. 5, land areas 20 and corresponding apertures 15 being located at the approximate center region of planar region 40, but has been further modified to include second region 70a containing third ridge region 76a following shoulder 36a, and fourth ridge region 78a following shoulder 72a; ridge region 78a is then followed by followed by second inside shoulder 74a which then transitions to planar region 40. The cross-sectional profile of outside edge region 25b is essentially identical to that of outside edge region 25a and includes (from the right) outside shoulder 35b, ridge region 30b, inside shoulder 36b which transitions in second region 70b to third ridge region 76b, followed by outside shoulder 72b, fourth ridge region 78b and second inside shoulder 74b. Ridge region 30a is coplanar with ridge region 30b, second ridge region 70a is coplanar with its counterpart 70b, and third ridge region 76a is coplanar with third ridge region 76b, and both 76a and 76b are coplanar with the underside of centre region 40.

Figure 11:
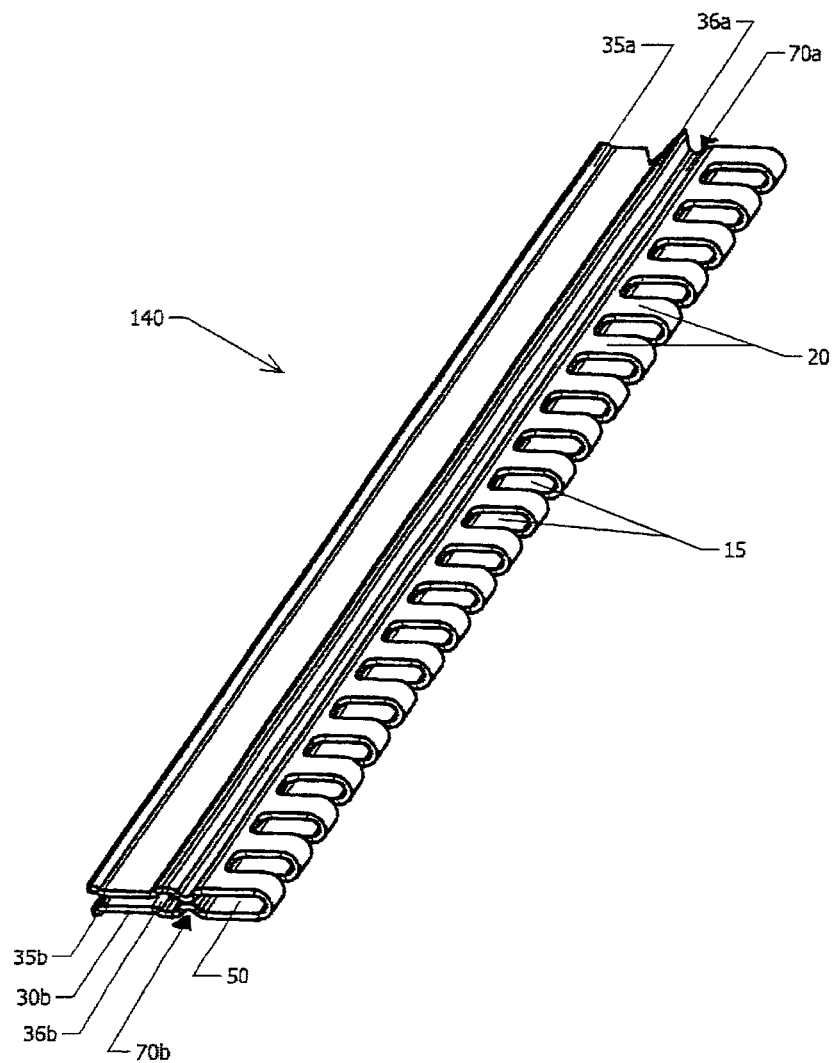
FIG. 11 is a perspective view of a seaming element in an embodiment of the invention formed from the stock material of FIGS. 9 and 10.
Figure 12:
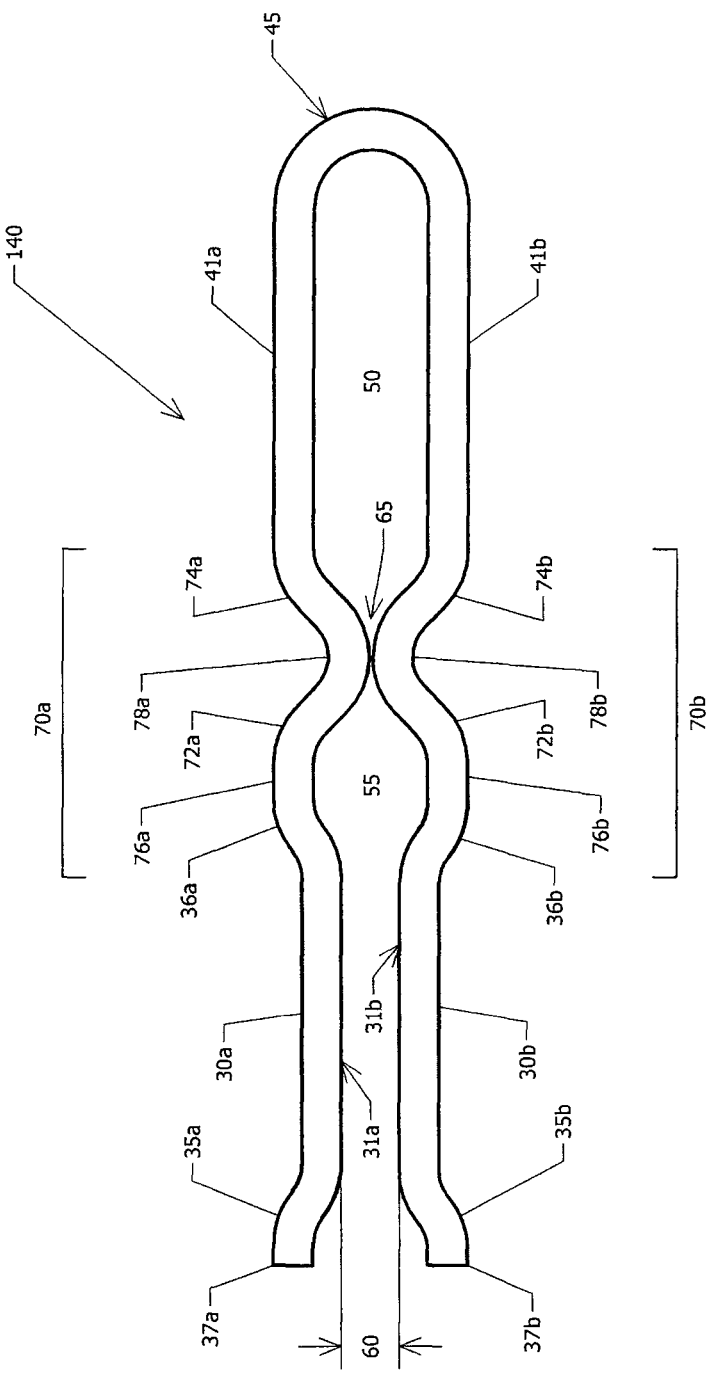
FIG. 12 is a cross-sectional end view of the seaming element of FIG. 11.

FIGS. 11 and 12 show the second shaped stock 130 shown in FIGS. 9 and 10 following at least one additional roll forming process step to provide a second seaming element 140 in a second embodiment of the invention. It will be appreciated that this at least one additional forming step has imparted a U-shaped bend in the stock 130 so that it now takes the final form of seaming element 140. Previously planar centre region 40 has been deformed by the roll forming process to provide to stock 130 a generally "U" shaped area 45 in which may be located apertures 15 and land areas 20 in the manner previously described in relation to FIGS. 7 and 8. Outside edge regions 25a, 25b (FIGS. 9 and 10) are now located in opposed relation so that ridge region 30a is located directly above ridge region 30b, second ridge region 70a is located in actual or near contact at 65 with corresponding opposite region 70b, and third ridge region 76a is located opposite to corresponding ridge region 76b, between which is formed open interior area 55. Interior open area 50 has been formed adjacent "U" shaped area 45 as a result of the roll forming process which has deformed previously planar stock material 100 into the configuration shown in FIGS. 9 and 10. The ridge regions 30a, 30b formed by shoulders 35a, 36a, and 35b, 36b respectively in an earlier roll forming stage are now located at the outside ends or legs of the "U", and the second shaped stock 130 has been bent along centre line of land areas 20 to form "U" shaped area 45 which may include loops and apertures for use in a subsequent joining process with a similarly shaped seaming element. The original stock material 100 is now in a configuration such as shown at 140 which will be suitable for use as a seaming element.

FIG. 12 is a cross-sectional view of seaming element 140 shown in FIG. 11. Note that, at the left, the upper outside edges 37a, 37b of shoulders 35a and 35b are coplanar with the exterior surfaces 41a and 41b of the "U" shaped area 45; they are also coplanar with the exterior surfaces of third ridge regions 76a, 76b respectively. The gap 60 formed between the interior surfaces 31a, 31b of ridge regions 30a, 30b is conveniently dimensioned so as to be equal in height to the thickness of the yarns or other material to which the seaming element is to be bonded, while interior open area 50 is dimensioned so as to accept at least one pin, pintle or similar joining element along its length.

In the configuration shown in FIGS. 11 and 12 for seaming element 140, it will be noted that at the second ridge regions 70a, 70b, a second open area 55 is formed interior to third ridge regions 76a, 76b and their corresponding shoulders. Third ridge regions 76a, 76b transition via shoulders 72a, 72b into fourth ridge regions 78a, 78b respectively to form closed gap 65. During installation of seaming element 140 onto an industrial textile, closed gap 65 serves as a fence or limiting means to prevent over-insertion of the material located at the textile edge. The exterior surfaces of third ridge regions 76a, 76b are coplanar with upper outside edges 37a, 37b respectively so that pressure can be applied during installation and welding to assure bond quality. This is highly desirable so that the quality of the weld or bond along the length of seaming element 140, along at least one of interior surfaces 31a, 31b can be assured, in the manner described in relation to the analogous locations 35a, 36a, 35b and 36b of the seaming element 120 of FIGS. 7 and 8.

During installation, the seaming element 120 shown in FIGS. 7 and 8, or seaming element 140 shown in FIGS. 11 and 12, is placed over the yarn ends of the textile in the manner described in relation to the prior art described in FIGS. 1 and 2. Once in position, a roll (which may be a heated roll, or a laser mounted in a transparent roll or globe) is rolled under pressure over the seam area including the textile body adjacent the seaming element, and the element itself. Because the exterior surfaces of shoulders 35a, 36a and 35b, 36b of the seaming element are located the same distance apart as the fabric thickness, any irregularities in the seamable edge caused by yarn or other textile component misalignment will be rolled flat and a weld will be assured due to the pressure applied through the shoulders to the ridges 30a, 30b, where bonding to the textile material can be effected along interior surfaces 31a, 31b. As noted above, the exterior surfaces of centre regions 41a, 41b (see FIG. 12) are coplanar with the shoulders 35a, 36a, 35b, 36b in particular their upper outside edges 37a, 37b, which are also constructed and arranged so as to be coplanar with the fabric body, thus minimizing any discontinuity at the region where the seaming element is joined to a fabric body (not shown). Further, the separation gap 60 of interior surfaces 31a and 31b in the shape 120 is dimensioned to be approximately equal to the thickness of the yarns or other material of the fabric to which the seaming element shape is bonded; these two aspects together assure a uniform weld of the seaming element across the width of the fabric during installation. In addition, in the embodiment of the seaming element 140 as shown in FIGS. 9 to 12, the element 140 has a profile which provides a closed gap 65 which may also be welded so as to permanently close it so as to prevent over-insertion and misalignment of the textile during seam element installation.

As shown in FIGS. 5 to 8, and 9 to 12, both of the continuous outside edge regions 25a and 25b of the shaped stock material such as 110 and 130 are formed so as to have essentially identical and mutually symmetrical ridge regions such as 30a, 30b, and 70a, 70b. This is not necessary and it may, in certain instances, be beneficial if one of the two ridge regions such as 30a or 70a was provided with a different profile to its opposite region such as 30b or 70b. For example, when installing a seam element such as 120 or 140 on differing fabric styles, it may be advantageous to leave one surface such as one or both of 30a and 70a essentially flat so that the yarns or other fabric components are offset to that region during the installation process. This may serve to simplify the installation of the seaming element, as it would not be necessary to centre it relative to the textile body to which it is attached. It is also not necessary that ridge regions such as 30a, 30b of a seaming element such as 120 be provided with the same profile and ridge regions. By introducing such asymmetry, it may be possible to make the welding area more incompressible and therefore achieve better pressure, hence a more secure weld, in a subsequent through transmission laser welding process.

Figure 13:
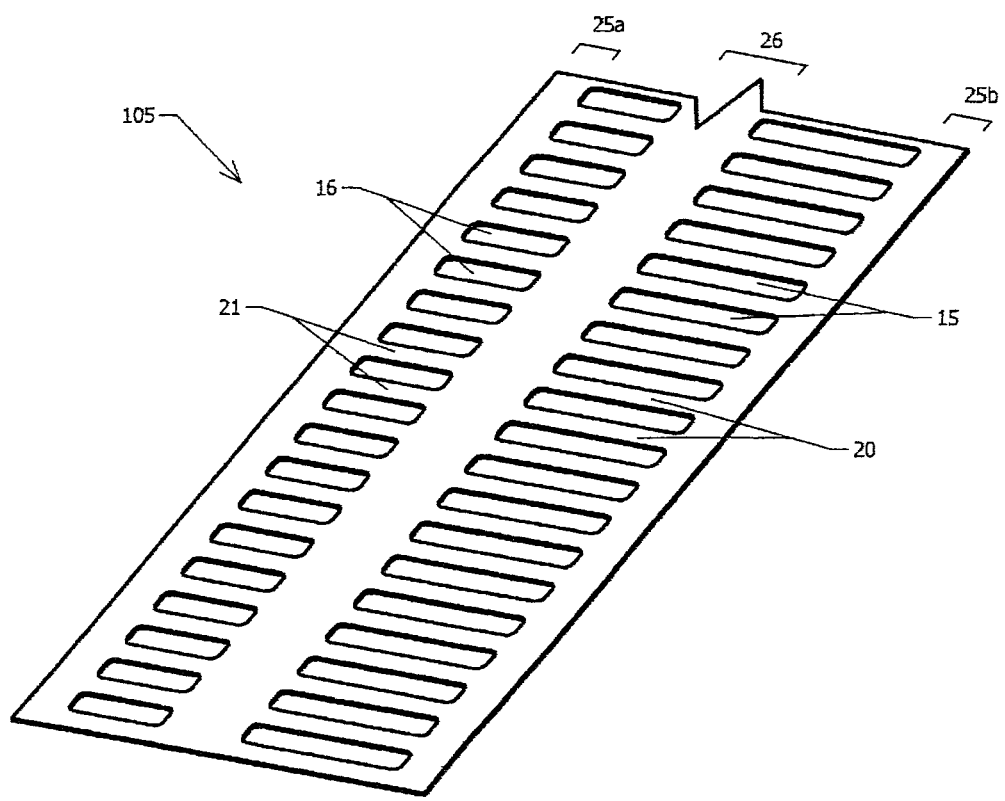
FIG. 13 is a perspective view of a blanked planar stock material in a third embodiment of the invention.

FIG. 13 is a perspective view of a second planar blanked stock material 105 for use in the progressive roll forming process such as is illustrated in FIG. 3 to form an eventual seaming element. As discussed further below, the stock material 105 is a generally planar thermoplastic film or sheet material, such as a PET film as described in CA 2,758,622 or CA 2,778,513 (both to Manninen); other thermoplastic film or sheet material may be suitable. Unlike planar stock material 100 (FIG. 4) the stock material 105 presented in FIG. 13 is provided with two parallel rows of apertures such as 15 and 16, separated and defined by corresponding land areas 20 and 21 respectively, the two rows of apertures being separated by centre region 26. The apertures may be formed during a blanking process prior to roll forming, or they may be provided at a later stage of seam element manufacture. Regardless of the stage in the process in which the apertures and land areas are formed, the stock material 105 is then passed through at least a first tandem roll set in a progressive roll forming process such as is illustrated at FIG. 3 to provide third seaming element profile 150 as shown in FIG. 14.

Figure 14:
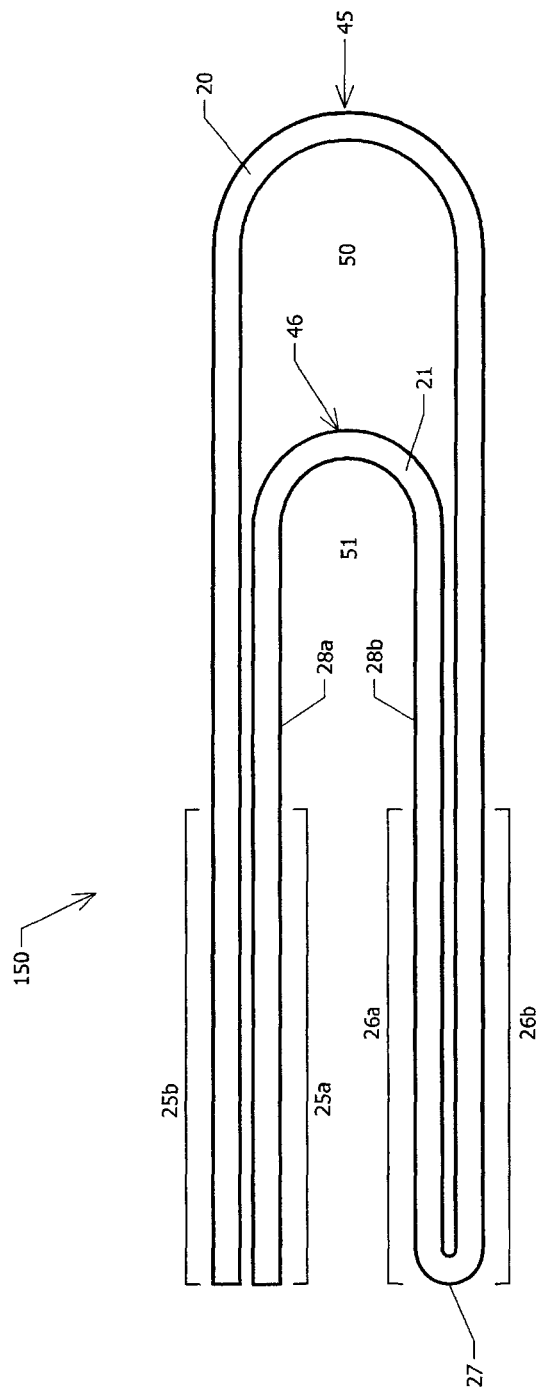
FIG. 14 is a cross-sectional end view of the stock material of FIG. 13, following a progressive roll forming process.

As shown in cross-section in FIG. 14, generally planar stock material 105 has been bent into the shape of the double nested "U" seaming element 150 by at least a first progressive roll forming process. Seaming element 150 includes continuous edge regions 25a, 25b which are arranged in intimate planar contact and located in opposed parallel relation with regions 26a, 26b which are likewise so arranged. Regions 26a, 26b are formed by imparting a tight fold to stock material 105 at the centre of region 26 to provide bend region 27, which forms one element of the trailing edge of the seaming element 150. From bend region 27, region 26a leads to second U-shaped region 46, and region 26b leads to first U-shaped region 45. At the opposing side of second U-shaped region 46, stock material 105 continues to outside edge region 25a, whereas stock material 105 continues from first U-shaped region 45 to outside edge region 25b. Interior to regions 45 and 46 are located open areas 50 and 51 which will, upon installation of completed seaming element 150 to a textile, form pintle receiving channels.

Figure 15:
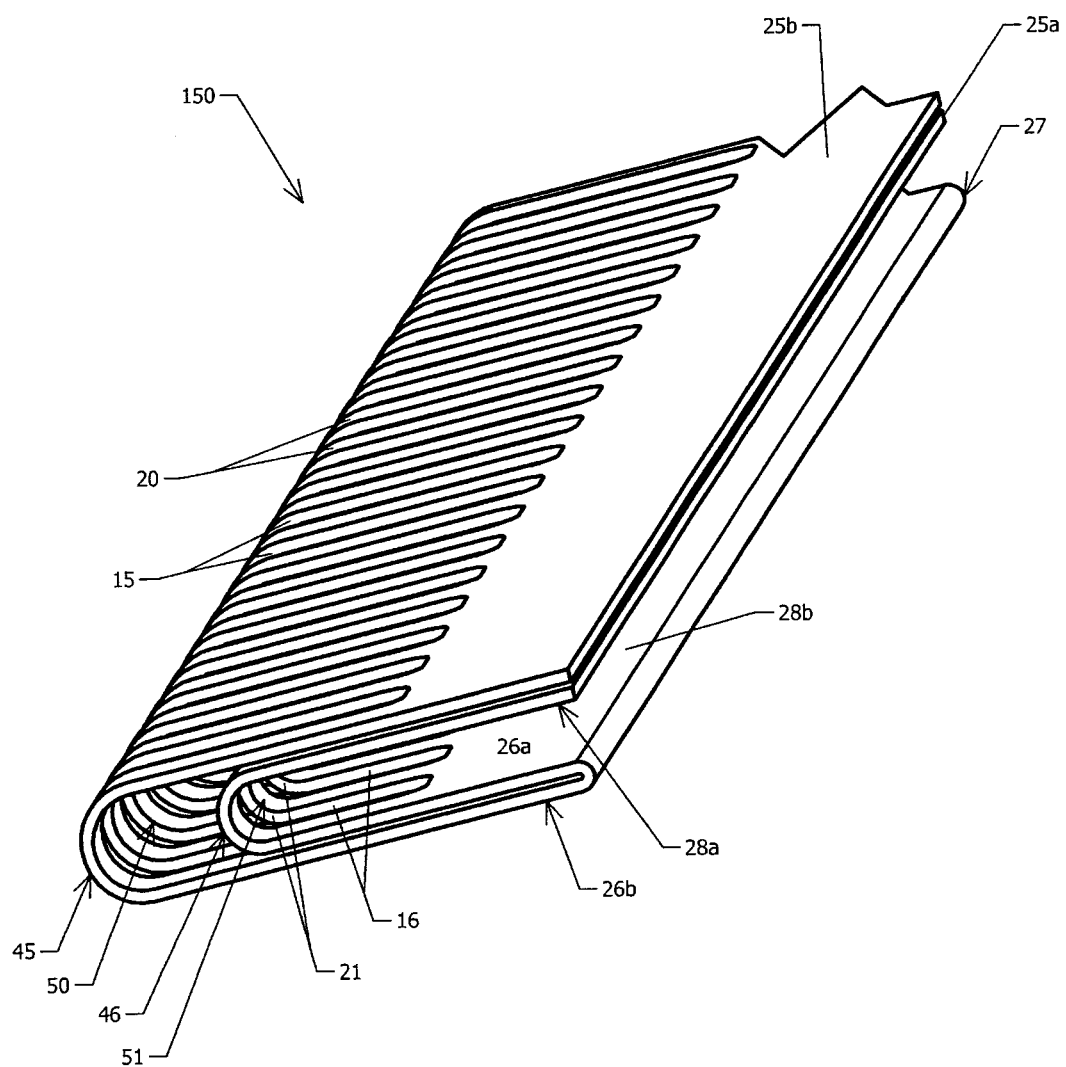
FIG. 15 is a perspective view of a seaming element in an embodiment of the invention formed from the stock material of FIGS. 13 and 14.

FIG. 15 is a first perspective view taken towards the trailing edge of seaming element 150 shown in cross-section at FIG. 14. Beginning at the top left of FIG. 15, it will be apparent that the loops 20 and apertures 15 of planar stock material 105 now form a series of continuous loops and openings as they wrap about U-shaped area 45. Regions 26a, 26b are tightly folded at region 27. On folding the stock material 105 at 27 to form second U-shaped region 46, a second and analogous series of loops 21 and apertures 16 is formed due to the previously blanked openings in the stock material 105. Regions 25a and 25b are preferably bonded together by welding, adhesives or other similar means to retain them in position and maintain the configuration of seaming element 150 as shown in FIG. 15.

Figure 16:
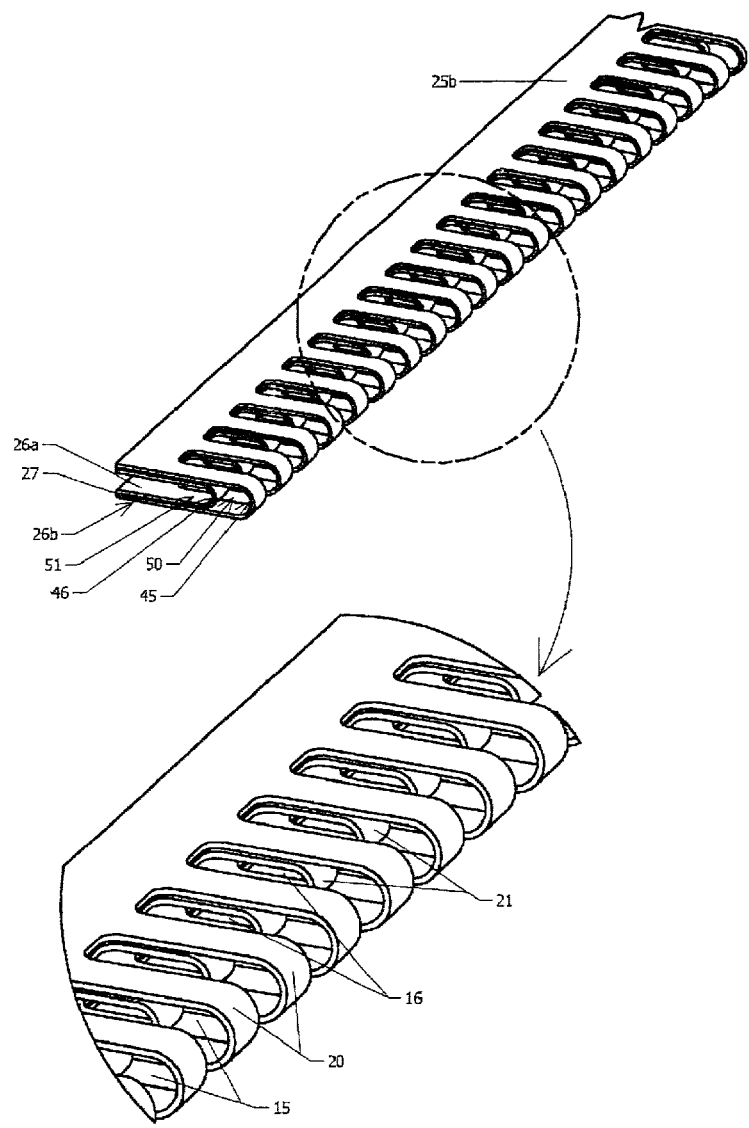
FIG. 16 provides a further perspective view and an enlarged view of a portion of the seaming element of FIG. 15.

FIG. 16 provides a second perspective view of the seaming element 150 shown in FIGS. 14 and 15, taken towards the leading edge of seaming element 150 and U-shaped regions 45 and 46. In addition, FIG. 16 illustrates an enlarged view of a portion of the seaming element Seaming element 150 is installed by placing the textile components such as thermoplastic yarns or film into the open area located between the interior surfaces 28a, 28b of the element; the element is then bonded to the textile component along these surfaces by means of through transmission laser welding or a similar attachment process so that land areas 20 and 21 and apertures 15 and 16 face towards a second, similarly configured seaming element to which the first would be joined. The two seaming elements at each of the opposing ends of the textile are then interdigitated; a seam may then be formed by inserting a pin, pintle or similar joining element through each of the channels 50, 51 now formed. A secure join is then created using the two channels of the seaming element 150.

The continuous outside regions 25a, 25b and 26a, 26b may each be imparted with a selected profile, including but not restricted to the profiles shown as at 30a, 30b or 76a, 76b, in order to provide the previously noted improvements to weld uniformity and to provide a fence, or limiter means, which will maintain uniform alignment of the textile components as they are inserted into the seaming element in the manner described in relation to second seaming element profile 140 shown in FIGS. 11 and 12.

Further, although the seaming elements have been described in relation to embodiments intended to be secured so as to enclose and compress the required portion of the seamable edges of a textile, the seaming elements of the invention can also be secured between layers of a multiple layer textile.

The invention claimed is:

1. A seaming element for seaming a first seamable edge of an industrial textile to a second seamable edge of the industrial textile, the seaming element being constructed and arranged to be affixed to the first seamable edge and comprising
    (i) an elongate body folded along its length at a folded connection region comprising a plurality of channelled protrusions engageable with and securable to corresponding channelled protrusions of a complementary seaming element affixed to the second seamable edge; and
    (ii) first and second body members extending from respective edges of the folded connection region and each having a free edge, each of the first and second body members being constructed and arranged to be directly securable to the first seamable edge,
    wherein the seaming element comprises at least one layer of film material; each of the first and second body members comprises a longitudinal profiled region having at least one ridge region and a plurality of shoulders, the longitudinal profiled region proximate and substantially parallel to the respective free edge; and the longitudinal profiled region of the first body member is symmetrical with the longitudinal profiled region of the second body member.

2. The seaming element according to claim 1, wherein the industrial textile comprises sets of interwoven yarns, and the seaming element is constructed and arranged to be directly securable to surfaces of selected ones of the yarns at and proximate the first seamable edge.

3. The seaming element according to claim 1, wherein the industrial textile comprises at least one layer of film, and the seaming element is constructed and arranged to be directly securable to surfaces of the film.

4. The seaming element according to claim 1, further comprising a profiled limiter means to restrict entry of the first seamable edge of the industrial textile into the folded connection region.

5. The seaming element according claim 1, wherein the elongate body is folded along its length at two folded connection regions, each folded connection region comprising a plurality of channeled protrusions engageable with and securable to corresponding channeled protrusions of a complementary seaming element affixed to the second seamable edge.

6. The seaming element according to claim 1, comprising only one layer of film material.

7. The seaming element according to claim 1, wherein the film material is a thermoplastic material selected from a polyester, polyphenylene sulphide (PPS), polyetheretherketone (PEEK), a polysulfone and a polyamide.

8. The seaming element according to claim 7, wherein the thermoplastic material is a polyester and is selected from poly(ethylene terephthalate) (PET), poly(butylene terephthalate) (PBT), poly(ethylene naphthalate) (PEN) and poly(1,4-cyclohexylene dimethylene terephthalate) acid (PCTA).

9. The seaming element according to claim 1, wherein the film material is a thermoset material and is a polyimide.

10. An industrial textile comprising at least one seaming element, the seaming element for seaming a first seamable edge of the industrial textile to a second seamable edge of the industrial textile, the seaming element being constructed and arranged to be affixed to the first seamable edge and comprising:

(i) an elongate body folded along its length at a folded connection region comprising a plurality of channeled protrusions engageable with and securable to corresponding channeled protrusions of a complementary seaming element affixed to the second seamable edge; and (ii) first and second body members extending from respective edges of the folded connection region and each having a free edge, each of the first and second body members being constructed and arranged to be directly securable to the first seamable edge, wherein the seaming element comprises at least one layer of film material, each of the first and second body members comprises a longitudinal profiled region having at least one ridge region and a plurality of shoulders, the longitudinal profiled region proximate and substantially parallel to the respective free edge, and the longitudinal profiled region of the first body member is symmetrical with the longitudinal profiled region of the second body member; and the at least one seaming element is bonded to the industrial textile by laser welding.

* * * * *